United States Patent [19]

Madsen

[11] 4,255,264

[45] Mar. 10, 1981

[54] ROTARY DRUM OR DISC FILTER

[75] Inventor: Rud F. Madsen, Nakskov, Denmark

[73] Assignee: Aktieselskabet de Danske Sukkerfabrikker, Copenhagen, Denmark

[21] Appl. No.: 48,005

[22] Filed: Jun. 13, 1979

[30] Foreign Application Priority Data

Jun. 23, 1979 [DK] Denmark ............... 2839/79

[51] Int. Cl.³ ............................... B01D 33/08
[52] U.S. Cl. ................... 210/404; 210/406; 210/411
[58] Field of Search ......... 210/391, 393, 395, 398, 210/402, 404, 406, 407, 408, 411, 416 R

[56] References Cited

U.S. PATENT DOCUMENTS

| | | | |
|---|---|---|---|
| 1,914,742 | 6/1933 | Hillier | 210/393 |
| 2,174,748 | 10/1939 | Hunter | 210/395 |
| 2,289,762 | 7/1942 | Duvall | 210/404 |
| 3,638,797 | 2/1972 | Heckman | 210/393 |
| 3,954,613 | 5/1976 | Worlidje | 210/391 |
| 3,972,817 | 8/1976 | Moe | 210/391 |

Primary Examiner—Theodore A. Granger
Attorney, Agent, or Firm—Watson, Cole, Grindle & Watson

[57] ABSTRACT

In a rotary drum or disc filter having circumferentially distributed cells in constant communication through open outlets with a common vacuum chamber, which may be the interior of the drum, or part of that interior, or a separate chamber rotating together with the filter. In a position of each cell where filter cake is to be blown off, a jet of compressed air or steam is injected into the respective outlet through a nozzle which combines with the outlet to form an ejector pump (jet pump).

9 Claims, 9 Drawing Figures

ROTARY DRUM OR DISC FILTER

BACKGROUND OF THE INVENTION

The invention relates to a rotary drum or disc filter comprising a filter sheet material carried by a rotary structure which is partly submerged in a liquid to be filtered and provides a plurality of circumferentially distributed cells on the inner side of said filter sheet material.

In filters of this type, filter cake is blown off from the filter sheet material in a predetermined position of each cell, which position is located above the level of submersion. For this purpose each cell is connected through a pipe to a manifold where valve functions in various arrangements are provided for the supply of vacuum and pressure to the individual cells in the correct position. This alternate supply of vacuum and pressure to the cells through the same pipes requires valve constructions, frequently slide valves, which are expensive to produce and often require considerable monitoring and maintenance.

SUMMARY OF THE INVENTION

It is the object of the invention to remedy this drawback. According to the invention, each cell communicates with a free outlet opening into a common vacuum chamber provided with means for the extraction of filtrate therefrom and maintaining a vacuum therein, at least one stream or compressed air nozzle being provided in the vacuum chamber and being arranged to form, in a predetermined blow-off position of each cell, together with the outlet with which that cell communicates, an ejector pump which sucks from the common vacuum chamber and blows into the cell, thereby to blow off filter cake from the filter sheet material.

By this arrangement the advantage is obtained that no valve control of the supply of vacuum to the cells is required, because the cells during the whole of their travel are in constant communication with the common vacuum chamber. Consequently, a valve control is only required in connection with the stream or compressed air supply to the steam or compressed air nozzles co-operating with the cell outlets. Even in an embodiment where a stream or compressed air nozzle rotating together with the common vacuum chamber is allocated to each outlet the control of the steam or compressed air supply to these nozzles will be a considerably simpler function than the control of alternate vacuum and compressed air supply to the cells in the known constructions. Thus, it will e.g. be possible to connect all the steam of compressed air nozzles permanently with a common rotating compressed air chamber and to mount simple valves, such as magnet valves, in the individual connections to the various steam or compressed air nozzles. It is, however, not even necessary to employ a steam or compressed air nozzles for each cell outlet, because it has been found that a satisfactory blow-off and ejector function can be obtained by constructing the cell outlets in the form of Venturi tubes, the openings of which during the ejector function are located at a distance from the opening of the steam or compressed air nozzles so that the Venturi tubes can pass by the nozzles. It is therefore possible to employ a single stationary nozzle so located that in the blow-off position of each cell the respective outlet moves past the stationary nozzle. In that case the blow-off can be controlled by means of a single valve that can be mounted outside the filter.

In cases where a satisfactory blow-off cannot be obtained during the short time interval when the Venturi tube is in operative position relative to a stationary nozzle, it is possible instead to use a nozzle which is adapted to be moved from a starting position so as to follow the circular travel of the outlet through a predetermined angle and then rapidly to return to the starting position. This can be obtained by a simple mechanical control of the nozzle, and since only a small angular movement is required it is possible to build in a hose connection in the compressed air supply so that it will still be unnecessary to use slide valves, and a single control valve outside the filter will suffice, or the nozzle may be mounted on a steam or compressed air chamber which is mounted on a stationary shaft which in well known manner contains the required supply conduits for compressed air, steam, vacuum, etc..

In rotary filters it is customary to sprinkle washing water onto the filter cake over part of the travel of the filter sheet material above the level of submersion and before the blow-off of filter cake. If this washing system is used in a filter according to the invention, it will be possible to suck washing water through the cells because these are under vacuum in the position considered, and if it is desired to drain off this washing water separately a tray for the collection of washing water may be mounted under part of the path of travel of the cell outlets above the level of submersion.

A reduction of the vacuum volume of a rotary drum filter can be obtained by limiting the common vacuum chamber to part of the length of the drum by means of a partition.

Similarly, it is possible both in a drum and a disc filter to arrange the vacuum chamber wholly outside the rotary structure carrying the filter sheet material and to dimension it exclusively in consideration of the space requirements involved by the outlet and blow-off function as such. Besides, the monitoring and maintenance of such a separate vacuum chamber will be greatly facilitated.

It is observed that filter constructions without the alternate supply of pressure and vacuum are known per se in the form of cell-less filters, where a vacuum is permanently maintained over practically the whole of the inner surface of the drum. In these cell-less filters it is, however, not possible to blow off filter cake in the manner proposed according to the invention. The blow-off frequently takes place by blowing compressed air or steam through so-called presser pads of rubber which are pressed against a small area of the inner surface of the drum. These presser pads often give rise to leakage and require much maintenance.

DESCRIPTION OF THE PREFERRED EMBODIMENTS.

Figure 1:
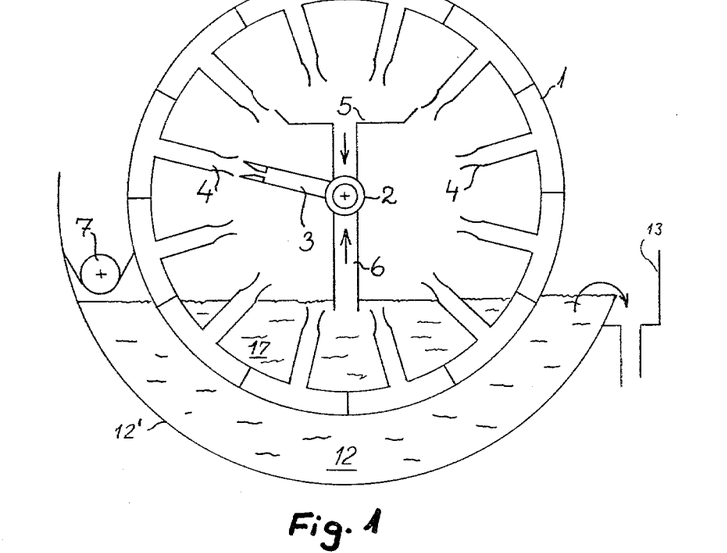
FIG. 1 shows diagrammatically a cross-section through a drum filter according to a first embodiment of the invention.

In FIG. 1, 1 is a filter drum subdivided into cells and covered exteriorly with a filter sheet material such as a perforated sheet, a filter network and/or a filter cloth. The drum rotates about a stationary shaft 2. In the drum a vacuum is maintained, filtrate 17 being sucked out through a filtrate extractor 6 and a conduit in the shaft 2 in well known manner. Each cell is provided with a free filtrate outlet 4 opening into the vacuum chamber formed in the drum. Inside the drum there is provided a compressed air or stream nozzle which is supplied through a conduit in the shaft 2 and is fixedly located in an angular position such that it faces an outlet 4 in the position where the filter cake is to be blown off. The outlet 4 and the compressed air or steam nozzle are so constructed that they combine to form a steam or compressed air jet pump, and the blowing-off of the cake takes place by the blowing of compressed air or steam through the nozzle 3 for a short time interval.

Figure 2:
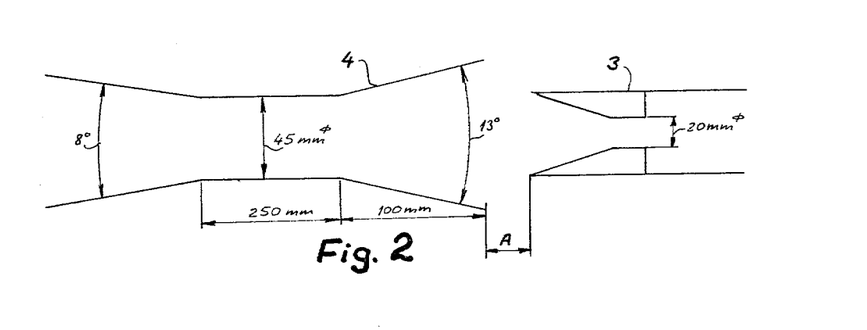
FIG. 2 shows on a larger scale an example of the detailed construction of a filtrate outlet and a compressed air nozzle forming part of the filter shown in FIG. 1.

An example of the construction of the outlet 4 and the nozzle 3 is shown in FIG. 2. Tests with an outlet 4 in the form of a Venturi tube with an inner diameter of 45 mm and a nozzle 3 with an inner diameter of 20 mm, as illustrated in FIG. 2, have shown that with an air pressure of 2.2 bar and a vacuum of 3 mm water column, the required blow-off pressure can be obtained even if the distance A between the openings of the outlet and the nozzle varies within 0–10 mm and the openings are offset up to 10 mm from one another. Therefore, the position of the nozzle 3 relative to the outlet 4 is not critical, and the outlet and the nozzle are capable of co-operating with a certain angular range of the rotation of the drum and the consequent circular travel of the outlet. If this angular range is not great enough, the nozzle may, instead of being stationary, be adaped to be moved from a starting position so as to follow the circular travel of the outlet through a predetermined angle and then rapidly to return to the starting position in readiness for co-operation with the next outlet. An example of such an arrangement will be described later with reference to FIGS. 5 and 6.

By means of a tray 5 washing water may be collected for extraction through a separate conduit in the stationary shaft 2.

7 is a conveying element, such as a worm for the removal of filter cake. This is arranged at one side of a trough 12' containing the liquid 12 to be filtered, into which the filter is partly submerged. An overflow 13 is provided at the other side of the trough 12'.

The drum may either rotate at a constant number of revolutions per minute or be advanced step by step, each step corresponding to the angular extension of a cell. The blow-off may be controlled automatically be means of a valve in the compressed air or steam supply outside the filter. The control may be performed mechanically, pneumatically or electrically in relation to the angular position of the drum.

If each of the cells of the filter has more than one outlet, a nozzle 3 may be provided at the axial location of each outlet.

Figure 3:
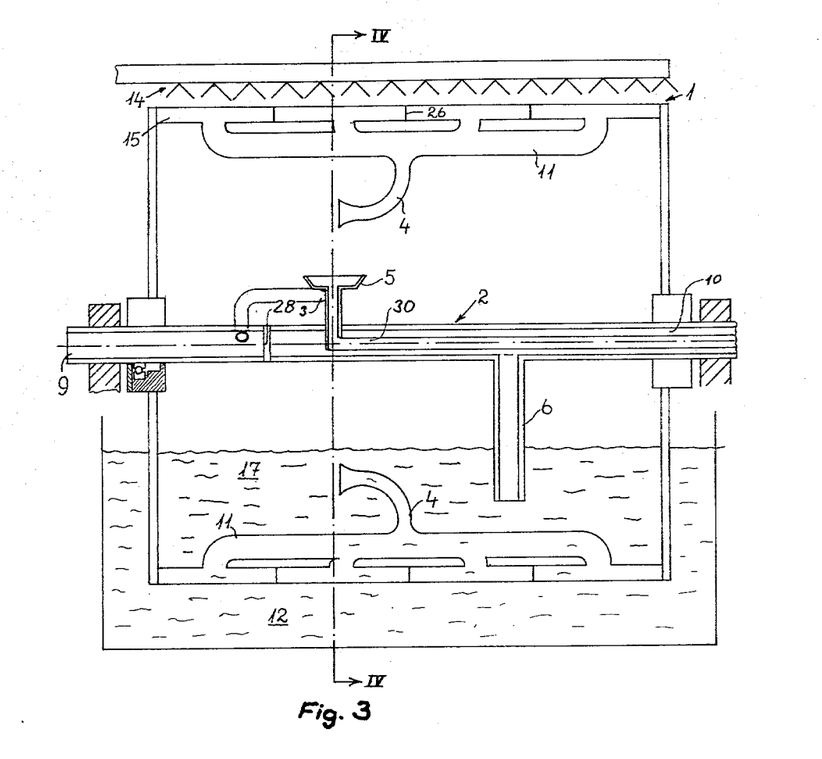
FIG. 3 shows a section along the line III—III in FIG. 4 through a drum filter according to a second embodiment of the invention.
Figure 4:
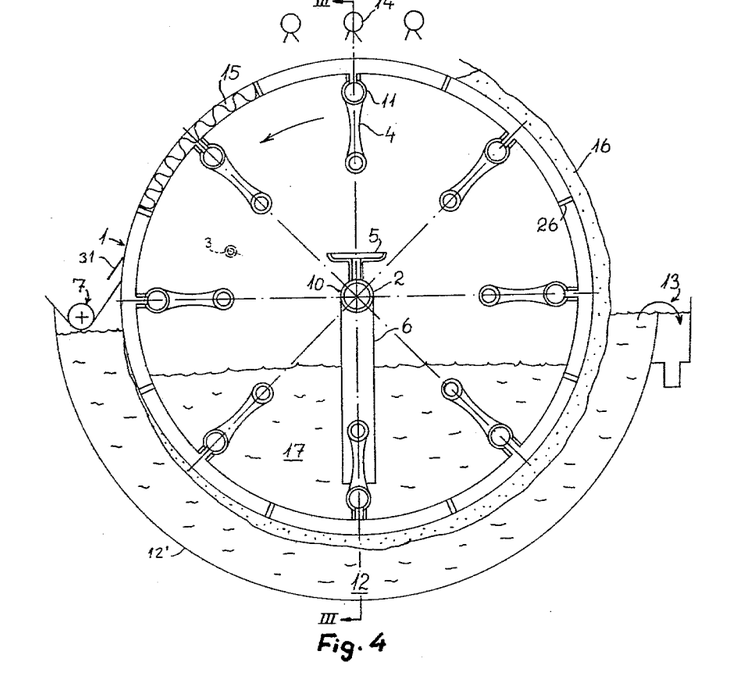
FIG. 4 shows a cross-section through the drum filter of FIG. 3 along the line IV—IV in FIG. 3.

Alternatively, as illustrated in the embodiment of FIGS. 3 and 4, a number of exits of a cell, or of a plurality of chambers into which this is subdivided by means of partions 26, may be connected through a manifold 11 to a common outlet 4 so that only one nozzle 3 is required. In FIG. 3, both the outlet 4 and the nozzle 3 are bent to horizontal position, but are otherwise constructed similarly as illustrated in FIG. 2. In FIG. 3, the shaft 2 is shown in the form of a hollow shaft which by means of a partition 28 is subdivided into two compartments supplied with compressed air or steam from the left-hand end 9 and with vacuum from the right-hand end 10. The washing water tray 5 is connected to a pipe extending within the hollow shaft. FIGS. 3 and 4 also show washing nozzle 14 for the sprinkling of water onto the filter cake which in FIG. 4 is denoted by 16. FIG. 4 also illustrates a scraper 31 immediately above the conveyor element 7.

Figure 5:
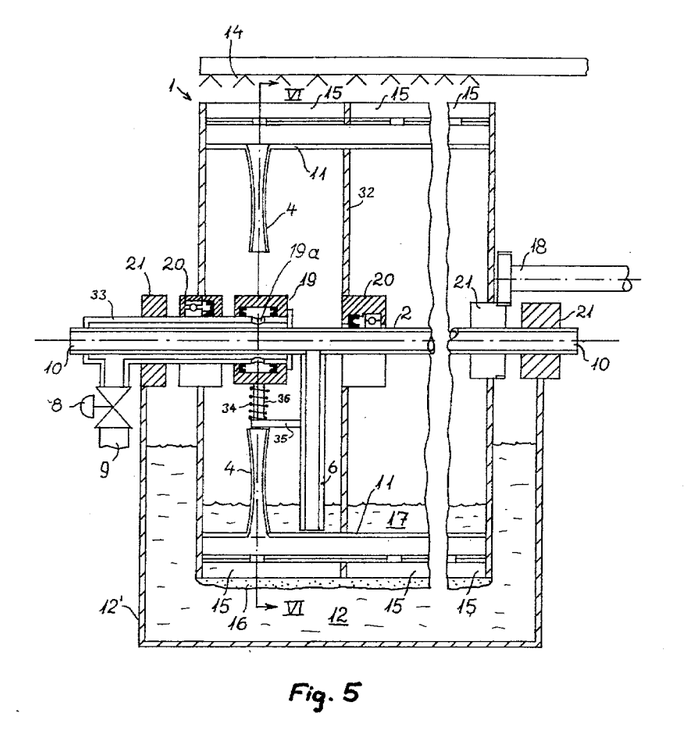
FIG. 5 shows a longitudinal section through a drum filter according to a third embodiment of the invention.
Figure 6:
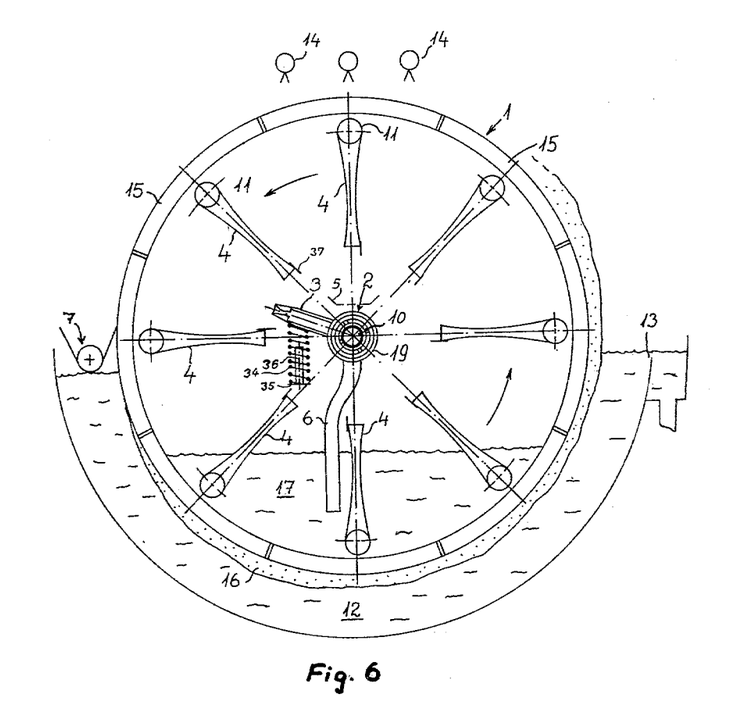
FIG. 6 shows a cross-section through the drum filter of FIG. 5 along the line VI—VI of FIG. 5.

In the embodiment of FIGS. 5 and 6, a number of exits from a cell, or from a plurality of chambers into which the cell is subdivided, like in FIGS. 3 and 4, are connected through a manifold 11 to a common outlet 4, which, however, in this case is radially disposed, like in FIG. 1. The outlet 4 has been drawn towards one end of the filter drum, so that it becomes possible to subdivide the interior of the drum by means of a partition 32 so that only the space on one side of this partition serves as a vacuum chamber. The shaft 2 is in this case constructed as a hollow shaft having exits 10 for filtrate and air at both ends. Surrounding the shaft 2 there is provided a sleeve 33 fixedly mounted on the shaft and supporting this on brackets 21. The drum is rotatably mounted on the sleeve 33 by means of a vacuum proof bearing 20. A pressure chamber 19 is rotatably mounted on the sleeve 33 and communicates with its interior through holes 19a. The sleeve is supplied with compressed air or steam through a pipe 9 with a control valve 8.

The nozzle 3 is fixedly mounted on the pressure chamber 19 and is urged in the clockwise direction, cf. FIG. 6, by a spring 34, which is supported by a fixed bracket 35 which also carries a stop 36 for the nozzle 3. On each of the outlets 4 there is mounted a projecting leaf spring 37 which strikes the upper side of the nozzle 3 when the respective outlet arrives in the blow-off position. At the same time the valve 8 is opened. During the continued rotation of the drum, the leaf spring 37 moves the nozzle 3 forward in unison with the outlet 4 until the nozzle strikes the stop 36. The leaf spring 37 now snaps past the nozzle 3, and this is then urged by the spring 34 back to its starting position in readiness for being engaged by the leaf spring of the next outlet, when this arrives in the blow-off position. In this manner the openings of the outlet 4 and the nozzle 3 are in alignment over a certain angular interval so that efficient blow-off takes place over the whole of this angular interval.

Figure 7:
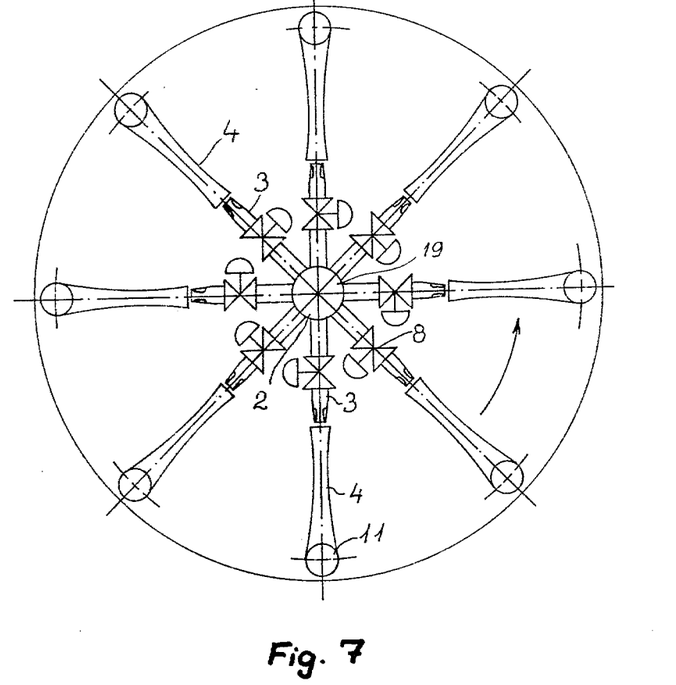
FIG. 7 shows a cross-section through a drum filter according to a fourth embodiment of the invention.

FIG. 7 shows an embodiment where a nozzle 3 is provided for each outlet 4. These nozzles are mounted on a pressure chamber 19 which may be constructed in the same manner as in FIG. 6, but which in FIG. 7 rotates together with the drum so that the nozzles 3 are constantly flush with the respective outlets 4. In this embodiment each nozzle is provided with a control valve 8 of its own, e.g. a magnet valve which is activated in the angular interval where blow-off of the filter cake is to take place.

Figure 8:
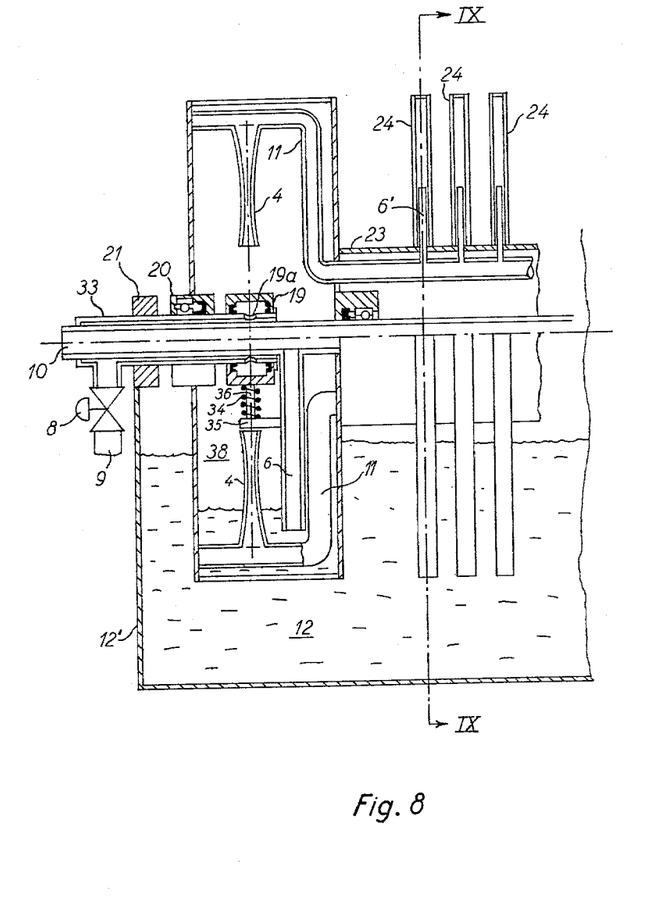
FIG. 8 shows a longitudinal section through a disc filter according to a fifth embodiment of the invention.
Figure 9:
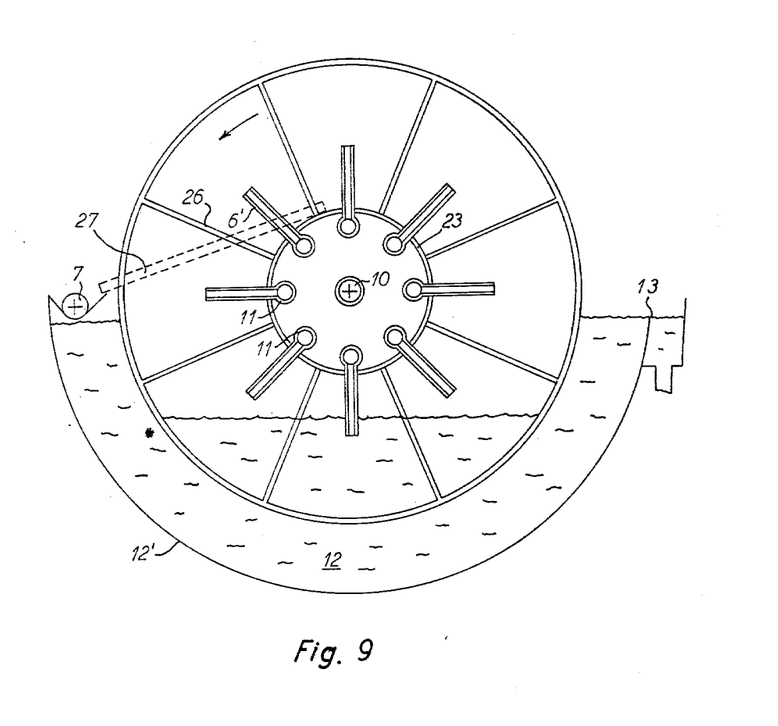
FIG. 9 shows a cross-section through the disc filter of FIG. 8 along the line IX—IX in FIG. 8.

FIGS. 8 and 9 illustrate an embodiment of the invention as applied to a disc filter. This filter has a separate vacuum chamber 38 which corresponds exactly to that of FIG. 5, but the filter itself consists of a plurality of hollow discs 24 (of which three are illustrated) mounted on a rotating hub 23 and carrying a filer sheet material on their plane surfaces. Each hollow disc is subdivided by partitions 26 into a plurality of cells, which are connected to the outlets 4 in the vacuum chamber 38 by means of sucking pipes 6' and manifolds 11. Between the discs 24 and on the outer side of the outermost discs chute-like scrapers 27 are mounted, which scrape off filter cake and guides it to the conveyor 7.

I claim:

1. A rotary drum or disc filter comprising a rotary structure including a plurality of circumferentially distributed filter cells arranged in drum or disc formation and including walls defining a vacuum chamber, each of said filter cells being in permanent flow connection with a free outlet also forming part of the rotary structure and opening into said vacuum chamber in an angular position corresponding to that of the filter cell, so that filtrate extracted through all of said outlets under the influence of a vacuum in said vacuum chamber collects at the bottom thereof, a stationary filtrate extractor tube, which is permanently connected to a vacuum source, being provided within said vacuum chamber in a position to extract filtrate collected at the bottom of said chamber and to maintain a permanent state of vacuum in said chamber, each of said outlets being constructed to be capable of forming the jet receiving part of a jet propulsion pump, at least one steam or compressed air nozzle constructed to be capable of forming a matching jet delivering part of a jet propulsion pump being provided in said chamber and being connectable to a source of steam or compressed air and so arranged and controlled as to blow a jet of steam or compressed air into each outlet in a predetermined blow-off position of the respective filter cell, the outlet and the nozzle thereby combining to form a jet propulsion pump which sicks from the vacuum chamber and blows into the filter cell.

2. A rotary drum or disc filter as in claim 1, in which a steam or compressed air nozzle rotating together with the common vacuum chamber is mounted in open, jet pump forming relationship to each outlet, but is activated only in the blow-off position of the relevant cell or cells and during the remainder of the revolution does not form an obstacle to the extraction of filtrate from the relevant cell or cells through the free outlets to the common vacuum chamber.

3. A rotary drum or disc filter as in claim 2, in which all the steam or compressed air nozzles are constantly connected with a common rotary steam or compressed air chamber, and that valves such as magnet valves are provided in the individual connections to the various steam or compressed air nozzles.

4. A rotary drum filter as in claim 1, in which said vacuum chamber is formed by part of the axial length of the inner space within said filter cells in drum formation, the vacuum chamber being separated from the remainder of said inner space by means of a partition.

5. A rotary drum or disc filter as in claim 1, in which said vacuum chamber forms a separate component of said rotary structure being axially displaced from said filter cells in drum or disc formation.

6. A rotary drum or disc filter as in claim 1 in which each outlet is formed by a Venturi-tube which in the blow-off position moves past a stationary steam or compressed air nozzle.

7. A rotary drum or disc filter as in claim 6 in which a tray for the collection of washing water is mounted in the common vacuum chamber under part of the path of travel of the cell outlets above the level of submersion.

8. A rotary drum or disc filter as in claim 1 in which each outlet is formed by a Venturi-tube which in the blow-off position moves past a steam or compressed air nozzle, means being provided for moving said nozzle from a starting position so as to follow the circular travel of the outlet through a predetermined angle and then rapidly to restore it to the starting position.

9. A rotary drum or disc filter as in claim 8 in which a tray for the collection of washing water is mounted in the common vacuum chamber under part of the path of travel of the cell outlets above the level of submersion.

* * * * *